US009529607B2

(12) United States Patent
Hasegawa et al.

(10) Patent No.: US 9,529,607 B2
(45) Date of Patent: Dec. 27, 2016

(54) GENERATING AN ORDERED LIST OF MANAGED TARGETS

(71) Applicant: INTERNATIONAL BUSINESS MACHINES CORPORATION, Armonk, NY (US)

(72) Inventors: Mihoko Hasegawa, Tokyo (JP); Hideaki Fujii, Fujisawa (JP); Daisuke Hayashi, Tokyo (JP); Ari Morishita, Yokohama (JP); Yohei Noda, Yokohama (JP); Hirokazu Yasumuro, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 14/195,467

(22) Filed: Mar. 3, 2014

(65) Prior Publication Data

US 2014/0289262 A1 Sep. 25, 2014

(30) Foreign Application Priority Data

Mar. 19, 2013 (JP) ................. 2013-057289

(51) Int. Cl.
G06F 17/30 (2006.01)
G06F 9/445 (2006.01)
(52) U.S. Cl.
CPC ......... G06F 9/445 (2013.01); G06F 17/30595 (2013.01)

(58) Field of Classification Search
None
See application file for complete search history.

(56) References Cited

U.S. PATENT DOCUMENTS

| 6,263,049 | B1 * | 7/2001 | Kuhn | H04M 3/51 |
| | | | | 379/265.06 |
| 8,019,756 | B2 | 9/2011 | Murakami et al. | |
| 9,065,660 | B2 * | 6/2015 | Ellis | H04L 12/1407 |
| 2008/0177526 | A1 | 7/2008 | Kano et al. | |
| 2012/0259729 | A1 | 10/2012 | Linden et al. | |

(Continued)

FOREIGN PATENT DOCUMENTS

| JP | 11-007453 | | 1/1999 |
| JP | 2001125910 | A | 5/2001 |

(Continued)

Primary Examiner — Belix M Ortiz Ditren
(74) Attorney, Agent, or Firm — Law Office of Jim Boice

(57) ABSTRACT

An apparatus generates an ordered list of managed targets. A list generating hardware unit generates a list of managed targets. A list displaying hardware unit displays, on a display device, the list of managed targets. The list generating hardware unit further acquires, from a predetermined storage device, history information relating to a session for each managed target from the list of managed targets, where the history information includes information for identifying a session executor who executed the session at a session time. The list generating hardware unit is further configured to determine, using acquired history information related to the session for each managed target from the list of managed targets, an order of the managed targets in the list of managed targets according to rules that are set based on a content of managed information for each managed target.

9 Claims, 10 Drawing Sheets

(56) References Cited

U.S. PATENT DOCUMENTS

2013/0124496 A1* 5/2013 Edgar ............... G06F 17/30876
707/708

FOREIGN PATENT DOCUMENTS

| JP | 2005242619 A | 9/2005 |
| JP | 2005332326 A | 12/2005 |
| JP | 2008176721 | 7/2008 |
| JP | 2008176742 | 7/2008 |
| JP | 2009048380 | 3/2009 |
| JP | 2009223767 A | 10/2009 |
| JP | 2010002944 A | 1/2010 |
| JP | 4973503 B2 | 7/2012 |
| WO | 2009078397 A1 | 6/2009 |

\* cited by examiner

FIG. 4

| IDENTIFYING INFORMATION | STATUS | HISTORY INFORMATION |
|---|---|---|
| .... | .... | ....... |
| .... | .... | ....... |
| ITEM 1 | IN ACTION | NULL |
| .... | .... | ....... |
| ITEM 2 | NEW | (5, TESTER, NEW, DATE 1) |
| .... | .... | ....... |
| ITEM 3 | IN ACTION | (6, DEVELOPER, IN ACTION, DATE 1)<br>(6, TESTER, IN ACTION, DATE 2) |

FIG. 5

| IDENTIFYING INFORMATION | SCORE |
|---|---|
| .... | ....... |
| .... | ....... |
| ITEM 1 | 0 |
| .... | ....... |
| ITEM 2 | 5 × 2 = 10 |
| .... | ....... |
| ITEM 3 | (6 × 1) + (6 × 2) = 18 |

FIG. 6

| IDENTIFYING INFORMATION | SCORE |
|---|---|
| .... | ....... |
| ITEM 3 | 18 |
| .... | ....... |
| ITEM 2 | 10 |
| .... | ....... |
| .... | ....... |
| ITEM 1 | 0 |

FIG. 7

| IDENTIFYING INFORMATION | SCORE |
|---|---|
| .... | ....... |
| ITEM 3 | 18 + (6 × 1) = 24 |
| .... | ....... |
| ITEM 2 | 10 + (10 × 2) = 30 |
| .... | ....... |
| .... | ....... |
| ITEM 1 | 0 |

FIG. 8

| IDENTIFYING INFORMATION | SCORE |
|---|---|
| .... | ....... |
| ITEM 2 | 30 |
| ITEM 3 | 24 |
| .... | ....... |
| .... | ....... |
| .... | ....... |
| ITEM 1 | 0 |

GENERATING AN ORDERED LIST OF MANAGED TARGETS

This application is based on and claims the benefit of priority from Japan (JP) Patent Application 2013-057289, filed on Mar. 19, 2013, and herein incorporated by reference in its entirety.

BACKGROUND

The present invention relates to an apparatus, method, and program for generating a list of a plurality of target items to be managed.

A management system for managing a plurality of items uses a list that displays items to be managed as one typical output form of managed information (information managed by the system). Here, the order of items (managed targets) in the list is determined from various rules that are set on the basis of the content of managed information for each managed target, an operation of registering the managed information, and other elements. Examples of the rules based on the content of the managed information can include a rule relating to text in the managed information (e.g., alphabetical order) and a rule relating to a numerical value (e.g., rule based on the magnitude of the value). Examples of the rules based on the operation of registering the managed information can include an order based on the creation date and time of the managed information and an order based on the update date and time thereof.

Normally, the items in this kind of the list can be sorted on the basis of the herein-described rules. For example, known list generations uses a traditional technique of generating a list in a search index in a search result by a search system being a management system with an order different from the order of registration and displaying the list.

SUMMARY

In one embodiment of the present invention, an apparatus for generating a list of managed targets the apparatus comprises: a list generating hardware unit configured to receive a list generating instruction for generating the list of managed targets and to generate the list of managed targets based on the received list generating instruction; and a list displaying hardware unit configured to display, on a display device, the list of managed targets that is generated by the list generating unit, wherein the list generating hardware unit is further configured to acquire, from a predetermined storage device, history information relating to a session for each managed target from the list of managed targets, wherein the history information comprises information for identifying a session executor, wherein the session executor is a user who has caused the session to be executed at a session time, wherein the session time is from a start of the session to an end thereof, and wherein the session time has been acquired by monitoring an execution of the session, and wherein the list generating hardware unit is further configured to determine, using acquired history information related to the session for each managed target from the list of managed targets, an order of the managed targets in the list of managed targets, wherein the order of managed targets from the list of managed targets is determined by one or more rules that are set based on a content of managed information for each managed target, and wherein the list generating hardware unit is further configured to generate the order of managed targets based on at least a combination of the list generating instruction, an identity of the session executor of each session for each managed target, and the session time of the session for each managed target.

In one embodiment of the present invention, a method generates a list of managed targets, the method comprising: receiving, by one or more processors, a list generating instruction for generating the list of managed targets and to generate the list of managed targets based on the received list generating instruction; displaying, by one or more processors and on a display device, the list of managed targets that is generated by the list generating unit; acquiring, by one or more processors using a predetermined storage device, history information relating to a session for each managed target from the list of managed targets, wherein the history information comprises information for identifying a session executor, wherein the session executor is a user who has caused the session to be executed at a session time, wherein the session time is from a start of the session to an end thereof, and wherein the session time has been acquired by monitoring an execution of the session; determining, by one or more processors using acquired history information related to the session for each managed target from the list of managed targets, an order of the managed targets in the list of managed targets, wherein the order of managed targets from the list of managed targets is determined by one or more rules that are set based on a content of managed information for each managed target, and generating, by one or more processors, the order of managed targets based on at least a combination of the list generating instruction, an identity of the session executor of each session for each managed target, and the session time of the session for each managed target.

In one embodiment of the present invention, a computer program product, when executed, generates a list of managed targets, the computer program product comprising a computer readable storage medium having program code embodied therewith, the program code readable and executable by a processor to perform a method comprising: receiving a list generating instruction for generating the list of managed targets and to generate the list of managed targets based on the received list generating instruction; displaying, on a display device, the list of managed targets that is generated by the list generating unit; acquiring, from a predetermined storage device, history information relating to a session for each managed target from the list of managed targets, wherein the history information comprises information for identifying a session executor, wherein the session executor is a user who has caused the session to be executed at a session time, wherein the session time is from a start of the session to an end thereof, and wherein the session time has been acquired by monitoring an execution of the session; determining, using acquired history information related to the session for each managed target from the list of managed targets, an order of the managed targets in the list of managed targets, wherein the order of managed targets from the list of managed targets is determined by one or more rules that are set based on a content of managed information for each managed target, and generating the order of managed targets based on at least a combination of the list generating instruction, an identity of the session executor of each session for each managed target, and the session time of the session for each managed target.

BRIEF DESCRIPTION OF THE SEVERAL VIEWS OF THE DRAWINGS

FIG. 4 illustrates an example of managed information managed by a management processing unit.

FIG. 5 illustrates the details of calculation of a score of each item in the managed information illustrated in FIG. 4.

FIG. 6 illustrates a state where the items in the list are sorted according to the scores illustrated in FIG. 5.

FIG. 7 illustrates the details of calculation of the score of each item in an example where further sessions are executed.

FIG. 8 illustrates a state where the items in the list are sorted according to the scores illustrated in FIG. 7.

DETAILED DESCRIPTION

Figure 1:
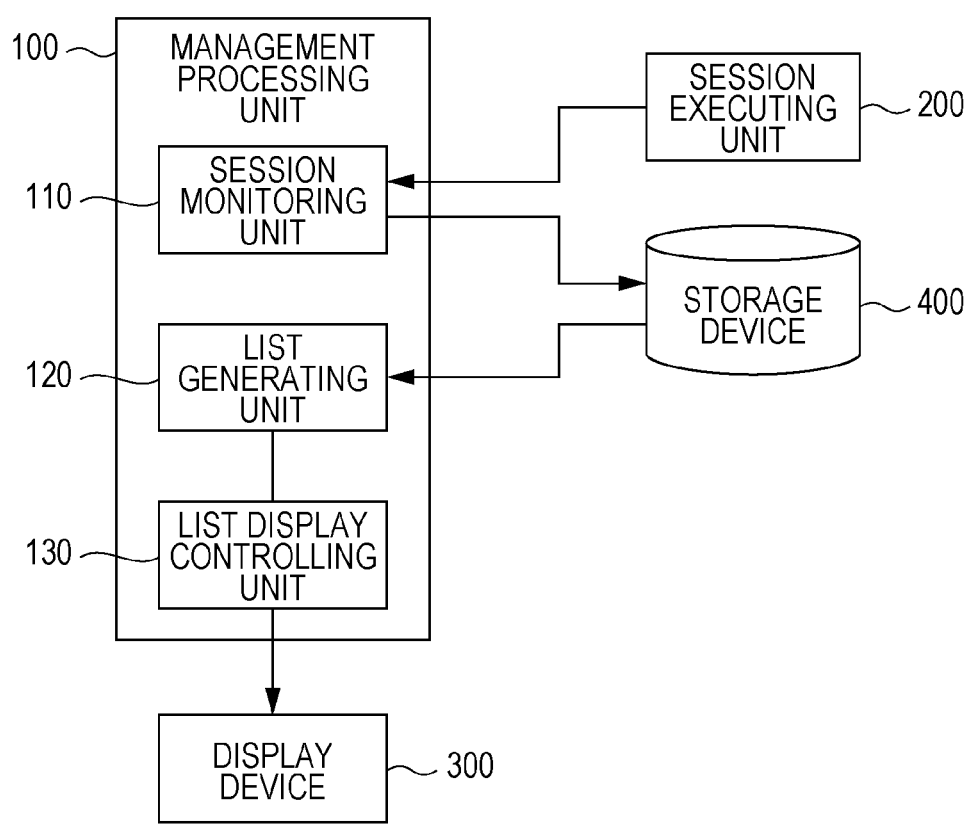
FIG. 1 is an exemplary block diagram of a functional configuration of a computer system (management system) to which an embodiment is applied.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of the present invention will be described in detail herein with reference to the accompanying drawings.

With reference then to FIG. 1, an exemplary block diagram of a functional configuration of a computer system (management system) to which the present embodiment is applied is presented. The management system illustrated in FIG. 1 includes a management processing unit 100 configured to manage a predetermined managed target and a session executing unit 200 configured to execute a session based on a target managed by the management processing unit 100. The system of the present embodiment is connected to a display device (e.g., liquid crystal display) 300 on which a list generated by the management processing unit 100 and an image created by the session executing unit 200 are displayed, as described herein.

Sessions executed by the session executing unit 200 in the present embodiment include various contents corresponding to managed targets. For example, when the managed target is an application program, executing the application program is a session. When the managed target is a data file, such as a text file or audio file, executing an application program that can use the data and displaying the content of the data on the display device 300 or playing the data is a session. Other various forms that allow users to use the managed targets can be sessions.

The management processing unit 100 includes a session monitoring unit 110 configured to monitor a session executed by the session executing unit 200, a list generating unit 120 configured to receive an instruction to generate a list (hereinafter referred to as list generating instruction) and to generate the list of managed targets, and a list display controlling unit 130 configured to display the list generated by the list generating unit 120 on the display device 300, as illustrated in FIG. 1.

When the session executing unit 200 executes a session relating to a managed target, the session monitoring unit 110 monitors this session and acquires information relating to the session. Specifically, for example, the session monitoring unit 110 acquires information for identifying a session executor being the user who causes the session to be executed, information about the time from the start to the end of the session, and other information. Here, the criterion for identification in the information for identifying the session executor is appropriately set in accordance with the type of the managed target, specifications for management, or other elements. For example, it may be information for identifying an individual of a session executor or may be information that just indicates the type (position) of a session executor of a session on a managed target, such as a user or an editor of data. The information for the session acquired by the session monitoring unit 110 is stored and retained as history information in a predetermined storage device 400.

The list generating unit 120 generates a list of managed targets on the basis of a list generating instruction received upon a user's operation. In the present embodiment, the list generating unit 120 estimates importance of each managed target for the user having input the list generating instruction on the basis of information about the user who has input the list generating instruction and history information relating to the session of the managed target, and controls the order of the items (managed targets) in the list on the basis of the estimation. Accordingly, the order of the managed targets in the list is set on the basis of a status of execution of past sessions for the managed targets (e.g., a session executor or execution time). The order of the managed targets in the generated list may be different depending on the type (position) of a user who has input the list generating instruction. A specific method of setting the order will be described herein. The list generated by the list generating unit 120 is displayed on the display device 300 under the control of the list display controlling unit 130.

Flow of Process in Management System

Processes in the management system having the herein-described configuration according to the present embodiment can be broadly classified into a process at the stage of executing a session for a managed target and acquiring history information, and a process at the stage of generating and displaying a list. The flow of each of these processes will be described herein with reference to flowcharts.

Figure 2:
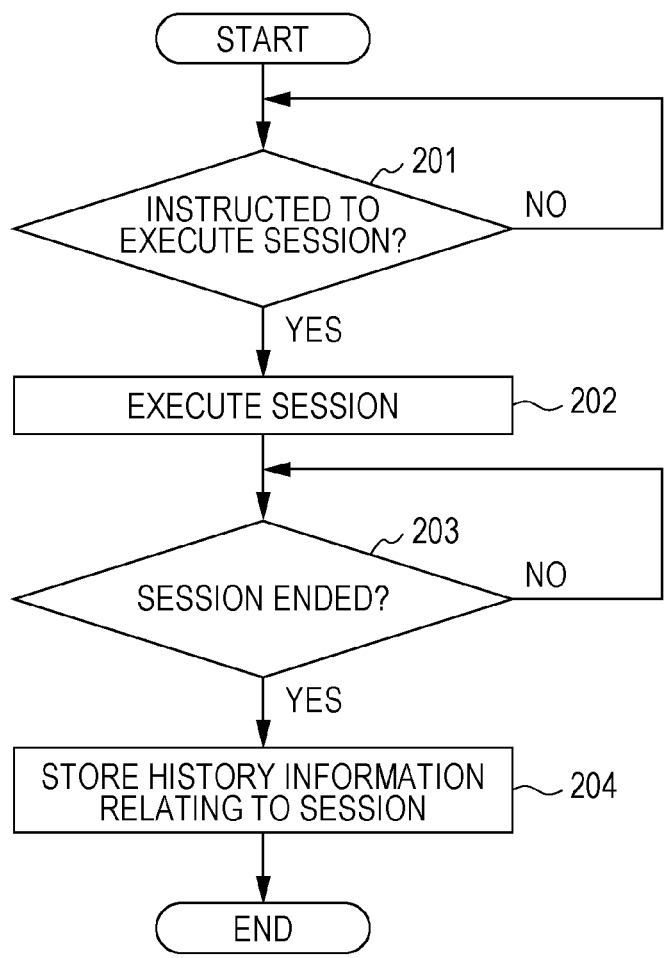
FIG. 2 is a flowchart that illustrates a process at the stage of acquiring history information relating to a session of a managed target.

FIG. 2 is a flowchart that illustrates the process at the stage of acquiring history information relating to a session of a managed target. As illustrated in FIG. 2, when information for identifying a session executor is input, and execution of a session is instructed by specifying a managed target (step 201), the session executing unit 200 executes the session for the specified managed target (step 202). At the time of completing the session, the session monitoring unit 110 in the management processing unit 100 stores history information of the executed session (steps 203 and 204). The history information includes the received information for identifying the session executor and the time from the start to the end of the session. Then, the process ends.

The managed target specified at step 201 is not limited to an existing managed target. For example, a new managed target may be registered in the management processing unit 100, and a user may cause the session executing unit 200 to execute a session by specifying the new managed target. In such a case where a new managed target is registered, history information may include information indicating that the managed target is new (i.e., that the managed target is newly specified after being registered and that a session has not yet been executed for the managed target).

Figure 3:
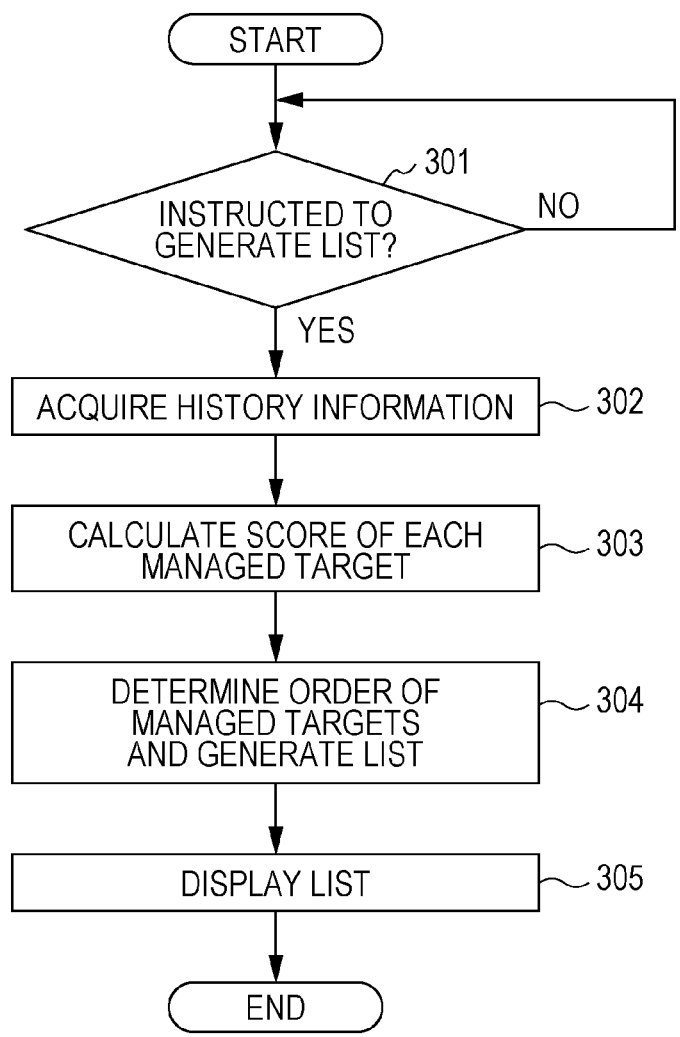
FIG. 3 is a flowchart that illustrates a process at the stage of generating and displaying a list.

FIG. 3 is a flowchart that illustrates a process at the stage of generating and displaying a list. As illustrated in FIG. 3, when information for identifying a user is input and list generation is instructed (step 301), the list generating unit 120 acquires history information relating to each managed target (step 302). This history information is information stored by the session monitoring unit 110 at step 204 in FIG. 2 at the time of executing the session for each managed target.

Then, the list generating unit 120 calculates a score of each managed target on the basis of the input information for identifying the user and the history information of the session for each managed target acquired at step 302 (step 303). A specific method of calculating the score is appropriately set on the basis of the type of the managed target or specifications on management. For example, it may be set such that the score of an item (managed target) increases with an increase in importance to the user.

After that, the list generating unit 120 determines the order of the items (managed targets) in a list on the basis of the calculated scores of the managed targets and generates the list (step 304). In the case where the scores are calculated such that the score of an item increases with an increase in importance to the user, as described herein, the managed targets are arranged in order of descending score. The list display controlling unit 130 displays the list generated at step 304 on the display device 300 (step 305). In this manner, the items (managed targets) are arranged in descending order of importance to the user in the list displayed on the display device 300.

Application Example of Present Embodiment

A specific example of application of the management system according to the present embodiment will be described herein. A case where managed targets are tasks of developing individual program modules in software development is discussed as an example of application of the management system. Here, a user being a session executor and a user who inputs a list generating instruction can be identified as a person in charge of developing software (hereinafter referred to as "developer"), a person who conducts a test on the software (hereinafter referred to as "tester"), and a person who manages tasks for developing the software (hereinafter referred to as "manager"). In the following description, information indicating distinctions among these users is referred to as "property" of each of the users.

A session executed by the session executing unit 200 is assumed as a task of opening a file of a program module being a managed target. The cases of opening a file of a program module being a managed target in relation to software under development may include a case where the program module is just viewed and a case where the description of the opened program module is edited. These two cases are not distinguished here for the sake of simplification, and execution of a session is identified in the case where a file is opened.

FIG. 4 illustrates an example of managed information managed by the management processing unit 100. In the example illustrated in FIG. 4, "identifying information", "status", and "history information" are managed for each managed target. FIG. 4 illustrates the specific contents of three managed targets of "item 1", "item 2", and "item 3" in "identifying information" and omits the specific description of other managed targets. "Status" is information that indicates a status of a managed target. Here, elements used in "status" are "new" and "in action". "New" indicates that the managed target is newly registered, and "in action" indicates that the managed target was already subjected to a session based on an instruction from another person after being registered and thus that the managed target is in action. In the illustrated example, the managed target of "item 1" and that of "item 3" are "in action", whereas the managed target of "item 2" is "new".

In the example illustrated in FIG. 4, "history information" contains the time from the start to the end of a session (hereinafter referred to as session time), the property of the session executor being the user, the status of the managed target, and the date of execution of the session. Here, in the illustrated example, the session time is measured in minutes. For example, the history information on "item 2" contains information of "5, tester, new, date 1". This means that the session time is five minutes, the property of the session executor is a tester, the status of the managed target is new, and the date of execution of the session is date 1. The history information on "item 3" indicates that two sessions have been executed, and it contains information of "6, developer, in action, date 1" for a first session and information of "6, tester, in action, date 2" for a second session. This means that the developer executed the first session for six minutes on date 1 and that the tester executed the second session for six minutes on date 2.

In the illustrated example, the history information on "item 1" is "null" and thus has no information. In this example, the history information has a period of validity. The null indicates that the period of validity for "item 1" from the previous session has expired. Depending on the managed targets, it may be preferable that information for a recent session be considered to properly determine the order in which the managed targets are displayed in a list. In such a case, as described herein, the history information may have a period of validity so that old history information may be prevented from being referred to.

Next, the calculation of a score illustrated at step 303 in FIG. 3 is described. In this example application, it is assumed that importance of a managed target increases with an increase in the length of the session time, and the sum of session times for each managed target is the score of that managed target. In this example application, a weight is assigned to the score of a managed target in accordance with a combination of a session executor and a user who has provided a list generating instruction. This aims to address a case where a managed target for which a specific session executor has executed a session may have high importance to the same user or another specific user. For example, a tester executes a session in order to conduct a test on a module of that managed target. Accordingly, it can be determined that a managed target for which a tester has executed a session (conducted a test) has high importance in the case where a developer refers to the list. Here, one example is discussed in which, in the case of generating a list on the basis of a list generating instruction from a developer, the score of a managed target based on the session time of a session executed by a tester is multiplied by two.

FIG. 5 illustrates the details of calculation of a score of each item in the managed information illustrated in FIG. 4. In the example illustrated in FIG. 5, a developer provides a list generating instruction. Referring to FIG. 4 and FIG. 5, "item 1" has no history information. Accordingly, the score of "item 1" is "0". For "item 2", its history information illustrated in FIG. 4 indicates that the session with a session time of five minutes has been executed by a tester. Accordingly, the score of "item 2" is "10", which is obtained by multiplying the score "5" based on the session time by the weight "2". For "item 3", its history information illustrated in FIG. 4 indicates that the session with a session time of six minutes has been executed by the developer and the session with a session time of six minutes has been executed by the tester. Accordingly, the score of "item 3" is "18", which is obtained by summing the score "6" and the score "12", the score "6" being based on the session time of the session by the developer, the score "12" being obtained by multiplying the score "6", which is based on the session time of the session by the tester, by the weight "2".

FIG. 6 illustrates a state where the items in the list are sorted according to the scores illustrated in FIG. 5. In the example illustrated in FIG. 5, the scores of "item 1", "item 2", and "item 3" are "0", "10", and "18", respectively.

Accordingly, a relative positional relationship among these items in the list illustrated in FIG. 6 is that "item 3" is in the top position, "item 2" is in the next position, and "item 1" is in the lowermost position. This positional relationship indicates a relative positional relationship among these three items. The scores of the items other than the illustrated three items in the list are also calculated in the same way, and the positions (order) in the list are determined.

Next, a case is discussed in which further sessions are executed in the state illustrated in FIG. 6. In this case, "item 2" is subjected to a session executed by the tester, and its session time is 10 minutes. "Item 3" is subjected to a session executed by the developer, and its session time is six minutes. The developer provides a list generating instruction.

FIG. 7 illustrates the details of calculation of the score of each item in the herein-described case. Referring to FIG. 7, because no session is executed on "item 1", its score remains "0". The score of "item 2" is "30", which is obtained by adding the score "20" corresponding to the latest session to the score "10" illustrated in FIG. 5. The score "20" corresponding to the latest session is obtained by multiplying the score "10" based on the session time by the weight "2". The score of "item 3" is "24", which is obtained by adding the score "6" based on the session time of the latest session to the score "18" illustrated in FIG. 5.

FIG. 8 illustrates a state where the items in the list are sorted according to the scores illustrated in FIG. 7. In the example illustrated in FIG. 7, the scores of "item 1", "item 2" and "item 3" are "0", "30", and "24", respectively. The score of "item 2" and that of "item 3" are compared. In FIG. 5, where the score of "item 2" is "10" and the score of "item 3" is "18", the score of "item 3" is larger than the score of "item 2". In contrast, in FIG. 7, where the score of "item 2" is "30" and the score of "item 3" is "24", the score of "item 2" is larger than the score of "item 3". Accordingly, "item 2" is placed high and "item 3" is placed low in the list illustrated in FIG. 8. Thus their positions in FIG. 6 are changed with each other in FIG. 8.

The above example illustrates an exemplary case where a developer provides a list generating instruction, and describes how execution of a session changes the score for each managed target and changes the order of the managed targets in the list at the time of generation of a list. In the present embodiment, as described above, the weight for use in weighting is set in accordance with a combination of a session executor and a user who has provided a list generating instruction. Thus even when managed targets have the same history information, the managed targets may have different scores if different users provide list generating instructions.

In the above-described example, in the case of generating a list on the basis of a list generating instruction from a developer, the score of a managed target for a session executed by a tester is obtained by multiplying its session time by the weight "2". In contrast to this, in the case of generating a list on the basis of a list generating instruction from a tester, if the weight for use in multiplying all the scores of managed targets based on session times is "1", the score of "item 2" calculated in the example illustrated in FIGS. 4 and 5 is "5", and the score of "item 3" is "12". In this case, a relative positional relationship between "item 2" and "item 3" on the generated list is that "item 3" is placed high and "item 2" is placed low, as in the case of the example illustrated in FIG. 6. However, because the scores are different, the order of all items, including items 2 and 3 and the other items, is not necessarily the same as that in the example illustrated in FIG. 6.

Other Examples of Setting Weight

In the above-described example of application, the weight for use in weighting is set in accordance with a combination of a session executor and a user who has provided a list generating instruction. Thus in the case of generating a list of managed targets at a certain point in time (that is, when specific history information is stored for each managed target), the score of each managed target is determined using an individual calculation expression in accordance with a user who has provided a list generating instruction, and the order in the list is determined. However, in the present embodiment, a method of setting the weight is not limited to the above-described method based on the user type. For example, different weights may be set in accordance with the statuses of managed targets. Specifically, in the above-described example of application, different weights may be set for a managed target with a status of "new" and a managed target with a status of "in action".

The weight may be not only a static value but also a dynamic value that varies over time. For example, setting a period of validity for history information, as described above, corresponds to multiplying the score based on a session time by the weight "0" for history information that expired the period of validity. Here, in addition to setting the weight "0" for history information that expired the period of validity, the weight may gradually decrease over time. For example, the weight may vary over time such that the weight is "1" in the first one week after a session and the weight is "0.5" in the next one week. Alternatively, depending on the managed target or specifications on management, the weight may gradually increase over time after a session.

Another Application Example of a Present Embodiment

A case will be discussed as an example in which the management system of the present embodiment is used to manage information relating to a defect when a program is executed and tested and the defect occurs. In this case, a session is an operation of generating a report on the defect. Specifically, examples of the session may include an operation of generating (or editing) a document file that describes the content of the defect using a text editor or other program and an operation of saving, as an image file, a screen appearing when the defect occurs (screen capturing) and describing a comment on the defect. A managed target is a report on information about the defect generated by the session (hereinafter referred to as defect report).

In this example of application, the list generating unit 120 can derive the score of each managed target at the time of generating a list in one example way described herein. First, the list generating unit 120 calculates a score based on a session time as a basic point, as illustrated in FIG. 5 and FIG. 7. This score may be subjected to weighting based on a combination of a session executor and a user who has provided a list generating instruction, as in the case of the illustrated example of application. The session here is an operation of opening a file (document file or image file) for a defect report and causing the file to be displayed on the display device 300. This file opening session may include just viewing the file or adding a new defect report to the file.

Next, the list generating unit 120 calculates an additional point based on the date and time when a question was written in a file of a defect report, adds the additional point to the above basic point, and determines that the result is the score of the managed target. This additional point is set on the basis of, for example, an elapsed time between the current date and time (at the time of providing a list generating instruction) and the date and time of writing the last question (hereinafter referred to simply as elapsed time). For example, if the value of the additional point increases with an increase in the length of the elapsed time, the score on the managed target for the defect report increases with an increase in the length of time elapsed from the writing of the last question, and the position of the managed target becomes higher on the list. A specific method of deriving a value is appropriately set in accordance with the types of the managed target and the session, or other elements. The additional point based on the elapsed time may be appropriately corrected on the basis of the content of history information relating to a session or other information.

Here, the date and time of writing a question is used to calculate an additional point because, if not a simple report but a question is written, an answer to the question is expected and the managed target is also considered to have high importance to a user who has provided a list generating instruction. The determination whether a message in a defect report is a question or not can be made on the basis of, for example, the presence or absence of the question mark "?" or the presence or absence of a typical pattern (e.g., in English, "Could you . . . ", "What . . . ", and other phrases). An example variation is that, depending on the type of a managed target or a session, if the same session executor asks questions in succession, an elapsed time to the present time may be measured relative to not the date and time of writing the last question but the date and time of writing the initial question by that session executor to calculate the additional point.

Another Example Method of Calculating Session Time

In the above example of application, the time for which a file being a managed target is opened is a session time. However, depending on the environment of running the management system of the present embodiment, a condition for deriving a session time may be added if needed. For example, when a user interface of a computer that implements the management system of the present embodiment is operable in multi-function mode, a plurality of overlapping windows of various screens may be displayed on the display device 300. Accordingly, even when a file being a managed target is opened, the session executor does not always actually look at that file. Thus, instead of the time for which a file being a managed target is opened, the time for which a window displaying that file is active may be measured as the session time.

If a long time elapsed without any input operation (e.g., clicking with a mouse button or tapping on a keyboard) after a file being a managed target was opened, a session executor may not look at the opened file because, for example, he or she leaves the seat. To address such a situation, if a certain time elapsed after the last input operation was performed, measuring the session time may stop. In addition, a score based on a session time may also be adjusted in accordance with an elapsed time from the moment when a file is opened or from the moment when an input operation is performed.

Figure 9:
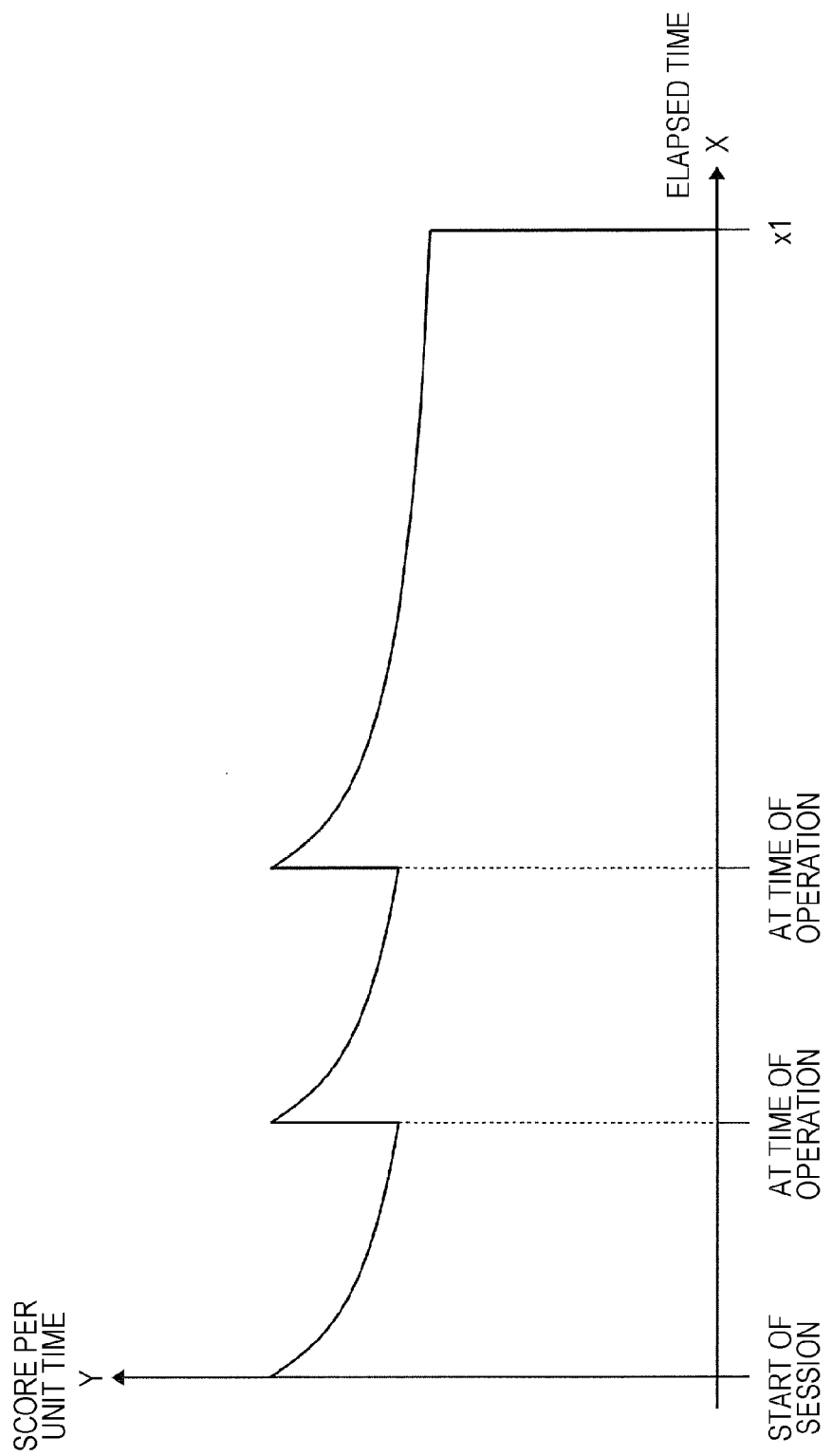
FIG. 9 illustrates an exemplary technique for adjusting a score based on a session time in accordance with an elapsed time from an input operation or other similar operations.

FIG. 9 illustrates an exemplary technique for adjusting a score based on a session time in accordance with an elapsed time from an input operation or other similar operations. In the graph illustrated in FIG. 9, the X direction indicates an elapsed time. The length in the Y direction indicates a score per unit time (e.g., one second). Accordingly, in the graph illustrated in FIG. 9, the area of a region surrounded with the solid lines (value obtained by the integral of the score per unit time with respect to the elapsed time) is the score based on the session time. Referring to FIG. 9, the score per unit time is maximum at the start of a session (at the time of opening a file) and at the time of each of input operations, and it gradually decreases over time thereafter. In the example illustrated in FIG. 9, after the second input operation, measuring the time stops when the time x1 elapses. Upon this, the score in this session is determined. If the session ends (the file is closed) before the time x1 elapses, measuring the time stops at that moment, and the score in this session is determined.

Hardware Configuration Example

Figure 10:
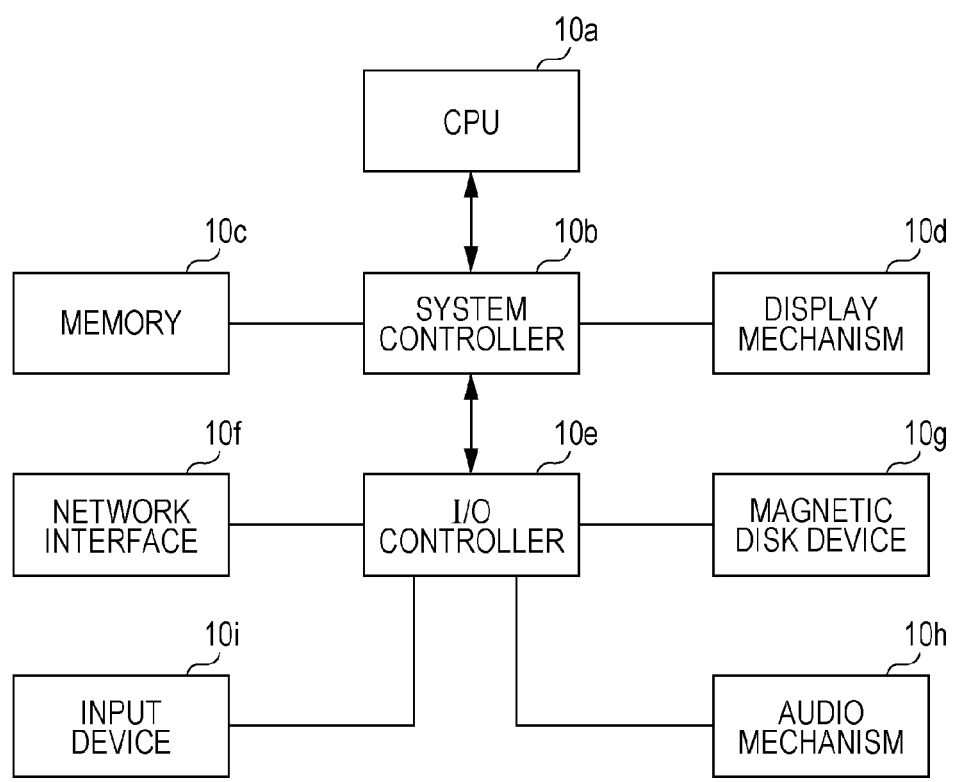
FIG. 10 is an exemplary block diagram of a hardware configuration suited for constructing the management system of the embodiment.

FIG. 10 is an exemplary block diagram of a hardware configuration suited for constructing the management system of the present embodiment. The computer illustrated in FIG. 10 includes a central processing unit (CPU) 10a being calculating means and a memory 10c being main storage means. The computer also includes, as external devices, a magnetic disk device (hard disk drive (HDD)) 10g, a network interface 10f, a display mechanism 10d, an audio mechanism 10h, and an input device 10i, such as a keyboard and a mouse.

In the example configuration illustrated in FIG. 10, the memory 10c and the display mechanism 10d are connected to the CPU 10a through a system controller 10b. The network interface 10f, the magnetic disk device 10g, the audio mechanism 10h, and the input device 10i are connected to the system controller 10b through an I/O controller 10e. The components are connected using various buses, including a system bus and an input and output bus.

FIG. 10 illustrates a hardware configuration of a preferable computer to which the present embodiment is applied, for merely illustrative purposes. The present embodiment can be broadly applied to a system that calculates importance of each managed target on the basis of a time of a session execution for a managed target and controls the order of managed targets in a list on the basis of calculated importance in generating the list of the managed targets. The present embodiment may be implemented in not only the illustrated configuration but also other configurations.

In FIG. 10, the magnetic disk device 10g stores programs of an operating system (OS) and application software. Reading these programs into the memory 10c and executing them by the CPU 10a can achieve the functions of the session monitoring unit 110, the list generating unit 120, and the list display controlling unit 130 in the management processing unit 100 and the function of the session executing unit 200 in the present embodiment. The storage device 400 may be implemented by storage means, such as the memory 10c and the magnetic disk device 10g. The display device 300 may be configured as part of the display mechanism 10d.

In the present embodiment, a method of determining a session time and a method of calculating a score based on the session time can be appropriately set in accordance with the environment of running the management system of the present embodiment, the type of a managed target, specifications on management, and other elements and are not limited to the herein-described methods.

In the above embodiment, the management processing unit 100 and the session executing unit 200 are present in the same system, and the management processing unit 100 includes the session monitoring unit 110. These units may be separately configured. That is, the session executing unit 200 as an individual system may execute a session and store and retain history information acquired upon the execution of the session in a predetermined storage device. Only the session monitoring unit 110 in the management processing unit 100 may be included in the system including the session executing unit 200, and the session monitoring unit 110 may acquire and retain the history information. Alternatively, the session executing unit 200 may have the function of outputting history information and enable acquiring and retaining the history information. When receiving a list generating instruction, the list generating unit 120 in the management processing unit may acquire the history information from the predetermined storage device, estimate importance of each managed target, and generate a list. In addition to the above-described configuration examples, configurations in which other various changes and improvement are added to the above-described embodiment are also included in the technical scope of the present invention.

In the prior art, a traditional list displaying is insufficient in flexibility in setting the order of items. For example, it is impossible to set the order of items according to importance of each managed target for each user in a management system. It is also impossible to automatically set the order of items according to the type (position) of a user in a management system, and each user needs to manually set a desired order of items according to his or her position.

In light of the above problem, it is an object of the present invention to achieve means capable of automatically setting the order of items with high flexibility in generating a list.

To attain the above-described object, the present invention may be implemented as an apparatus as described herein. The apparatus generates a list of managed targets and includes a list generating unit and a list displaying unit. The list generating unit is configured to receive a list generating instruction for generating the list of the managed targets and to generate the list of the managed targets on the basis of the received list generating instruction. The list displaying unit is configured to display the list generated by the list generating unit on a display device. The list generating unit is configured to acquire, from a predetermined storage device, history information which includes at least information for identifying a session executor being a user who has caused a session for each managed target to be executed and a session time being a time from a start of the session to an end thereof, and has been acquired by monitoring execution of the session. The list generating unit is further configured to determine, using the acquired history information, an order of the managed targets in the list and generate the list on the basis of at least a combination of a user who has provided the list generating instruction and the session executor of each session for each managed target, and the session time of each session for each managed target.

The present invention may also be implemented as an apparatus described herein. The apparatus generates a list of managed targets and includes an executing unit, a monitoring unit, and a list generating unit. The executing unit is configured to execute a session for a managed target. The monitoring unit is configured to monitor the session executed by the executing unit and to acquire history information including at least information for identifying a session executor being a user who has caused the session to be executed and a session time being a time from a start of the session to an end thereof. The list generating unit is configured to receive a list generating instruction for generating the list of the managed targets, to determine an order of the managed targets in the list using the history information relating to each session for each managed target acquired by the monitoring unit on the basis of at least a combination of a user who has provided the list generating instruction and the session executor of the session for each managed target and the session time of each session for each managed target, and to generate the list.

Preferably, in each of the apparatus, the list generating unit may be configured to estimate importance of each managed target for the user who has provided the list generating instruction on the basis of a length of the session time and configured to generate the list such that, of the managed targets, a managed target estimated to have higher importance is placed higher on the list. Alternatively, the list generating unit may be configured to generate the list such that, of the managed targets, a managed target with a longer session time is placed higher on the list. Preferably, the list generating unit may be configured to assign a weight to the estimation based on the session time on the basis of the combination of the user who has provided the list generating instruction and the session executor of each session for each managed target to estimate the importance of each managed target.

The present invention may also be implemented as a method for use in generating a list of managed targets by a computer described below. The method includes the steps of receiving a list generating instruction for generating the list of the managed targets, acquiring, for each session for each managed target, information for identifying a session executor being a user who has caused the session to be executed and a session time being a time from a start of the session to an end thereof, the information and the session time being acquired by monitoring execution of the session for each managed target and being retained, and determining an order of the managed targets in the list and generating the list. The order is determined using the acquired information relating to each session for each managed target, which includes the identifying information of the session executor and the session time, on the basis of at least a combination of a user who has provided the list generating instruction and the session executor of each session for each managed target, and the session time of each session for each managed target.

The present invention may also be implemented as a program that causes a computer to implement the functions of the herein-described apparatuses or a program that causes a computer to execute the herein-described steps. The program may be provided by distribution of magnetic disks, optical disks, and other recording media in which the program is stored and may also be provided by distribution over a network.

According to the present invention, the order of items can be automatically set with high flexibility in generating a list.

The invention claimed is:

1. An apparatus for generating an ordered list of managed targets, the apparatus comprising:
   a list generating hardware unit configured to receive a list generating instruction for generating the list of managed targets and to generate the list of managed targets based on the received list generating instruction; and
   a list displaying hardware unit configured to display, on a display device, the list of managed targets that is generated by the list generating unit,
   wherein the list generating hardware unit is further configured to acquire, from a predetermined storage device, history information relating to a session for each managed target from the list of managed targets, wherein the history information comprises information for identifying a session executor, wherein the session executor is a user, wherein the user has caused the session to be executed at a session time, wherein the session time is from a start of the session to an end thereof, and wherein the session time has been acquired by monitoring an execution of the session, and wherein the list generating hardware unit is further configured to determine, using acquired history information related to the session for each managed target from the list of managed targets, an order of the managed targets in the list of managed targets, wherein the order of managed targets from the list of managed targets is determined by one or more rules that are set based on a content of managed information for each managed target, wherein the list generating hardware unit is further configured to generate the order of managed targets based on at least a combination of the list generating instruction, an identity of the session executor of each session for each managed target, and the session time of the session for each managed target; and wherein the list generating unit is further configured to assign a weight to an estimation of importance based on the session time, wherein said importance is based on a combination of an identity of the user that has provided the list generating instruction and the identity of the session executor of each session for each managed target, and wherein said weight estimates an importance level of each managed target.

2. The apparatus according to claim 1, wherein the list generating unit is further configured to estimate an importance of each managed target for a user that has provided the list generating instruction, wherein said importance of each managed target is based on a length of the session time, and wherein a managed target estimated to have a higher importance than another managed target is placed higher on the list of managed targets than said another managed target.

3. The apparatus according to claim 1, wherein the list generating hardware unit is further configured to generate the list of managed targets such that, of the managed targets, a managed target with a longer session time is placed higher on the list of managed targets than a managed target that has a session time that is shorter than the longer session time.

4. A method for generating an ordered list of managed targets, the method comprising:
receiving, by one or more processors, a list generating instruction for generating the list of managed targets and to generate the list of managed targets based on the received list generating instruction;
displaying, by one or more processors and on a display device, the list of managed targets that is generated by the list generating unit;
acquiring, by one or more processors using a predetermined storage device, history information relating to a session for each managed target from the list of managed targets, wherein the history information comprises information for identifying a session executor, wherein the session executor is a user, wherein the user has caused the session to be executed at a session time, wherein the session time is from a start of the session to an end thereof, and wherein the session time has been acquired by monitoring an execution of the session;
determining, by one or more processors using acquired history information related to the session for each managed target from the list of managed targets, an order of the managed targets in the list of managed targets, wherein the order of managed targets from the list of managed targets is determined by one or more rules that are set based on a content of managed information for each managed target,
generating, by one or more processors, the order of managed targets based on at least a combination of the list generating instruction, an identity of the session executor of each session for each managed target, and the session time of the session for each managed target, and
assigning, by one or more processors, a weight to an estimation of importance based on the session time, wherein said importance is based on a combination of an identity of the user that has provided the list generating instruction and the identity of the session executor of each session for each managed target, and wherein said weight estimates an importance level of each managed target.

5. The method according to claim 4, further comprising:
estimating, by one or more processors, an importance of each managed target for a user that has provided the list generating instruction, wherein said importance of each managed target is based on a length of the session time, and wherein a managed target estimated to have a higher importance than another managed target is placed higher on the list of managed targets than said another managed target.

6. The method according to claim 4, further comprising:
generating, by one or more processors, the list of managed targets such that, of the managed targets, a managed target with a longer session time is placed higher on the list of managed targets than a managed target that has a session time that is shorter than the longer session time.

7. A computer program product for generating an ordered list of managed targets, the computer program product comprising a computer readable storage medium having program code embodied therewith, the program code readable and executable by a processor to perform a method comprising:
receiving a list generating instruction for generating the list of managed targets and to generate the list of managed targets based on the received list generating instruction;
displaying, on a display device, the list of managed targets that is generated by the list generating unit;
acquiring, from a predetermined storage device, history information relating to a session for each managed target from the list of managed targets, wherein the history information comprises information for identifying a session executor, wherein the session executor is a user, wherein the user has caused the session to be executed at a session time, wherein the session time is from a start of the session to an end thereof, and wherein the session time has been acquired by monitoring an execution of the session;
determining, using acquired history information related to the session for each managed target from the list of managed targets, an order of the managed targets in the list of managed targets, wherein the order of managed targets from the list of managed targets is determined by one or more rules that are set based on a content of managed information for each managed target,
generating the order of managed targets based on at least a combination of the list generating instruction, an identity of the session executor of each session for each managed target, and the session time of the session for each managed target; and
assigning a weight to an estimation of importance based on the session time, wherein said importance is based on a combination of an identity of the user that has provided the list generating instruction and the identity of the session executor of each session for each managed target, and wherein said weight estimates an importance level of each managed target.

8. The computer program product according to claim 7, wherein the method further comprises:
estimating an importance of each managed target for a user that has provided the list generating instruction, wherein said importance of each managed target is based on a length of the session time, and wherein a managed target estimated to have a higher importance than another managed target is placed higher on the list of managed targets than said another managed target.

9. The computer program product according to claim 7, wherein the method further comprises:
generating the list of managed targets such that, of the managed targets, a managed target with a longer session time is placed higher on the list of managed targets than a managed target having a session time that is shorter than the longer session time.

* * * * *